Patented Nov. 12, 1940

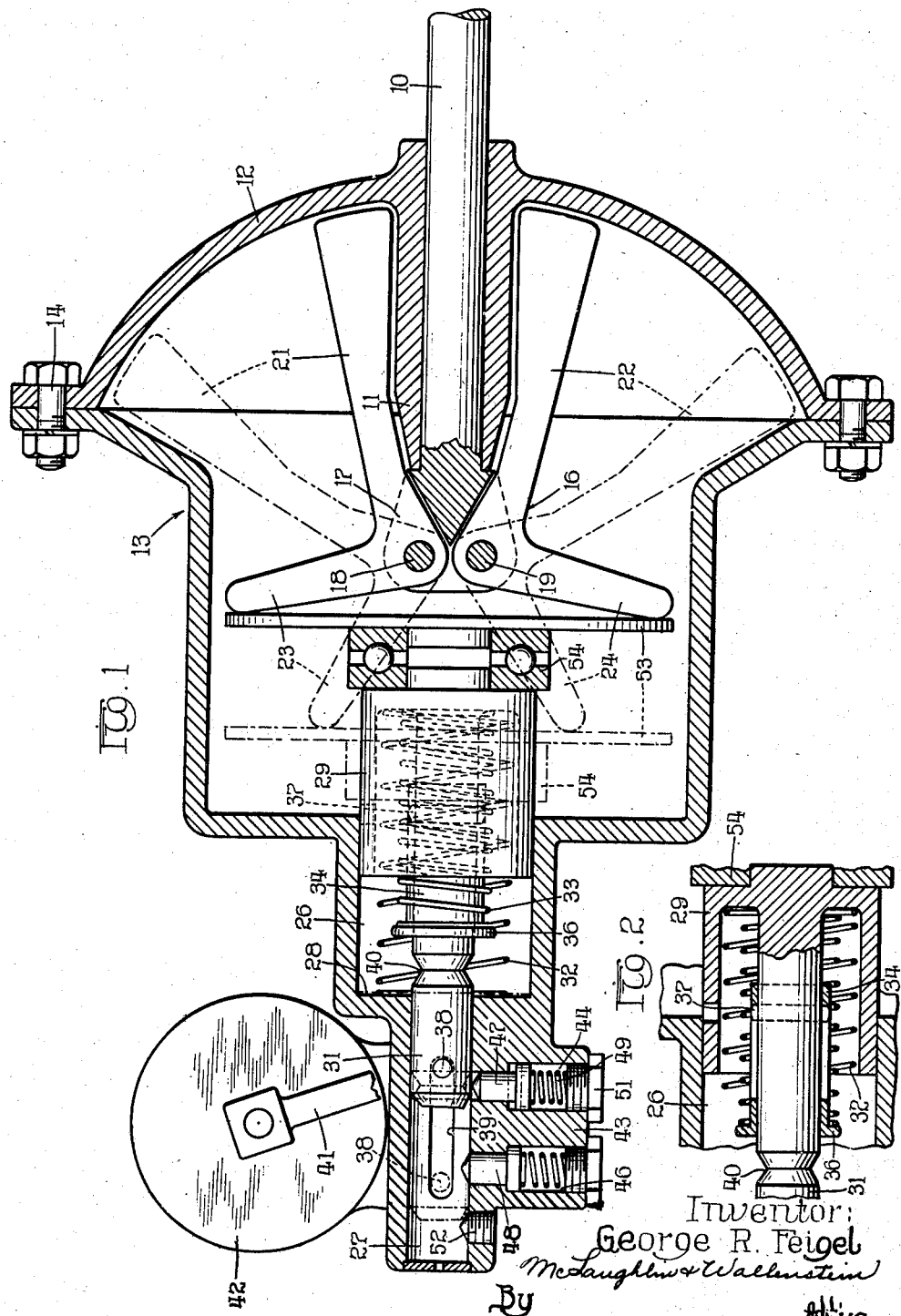

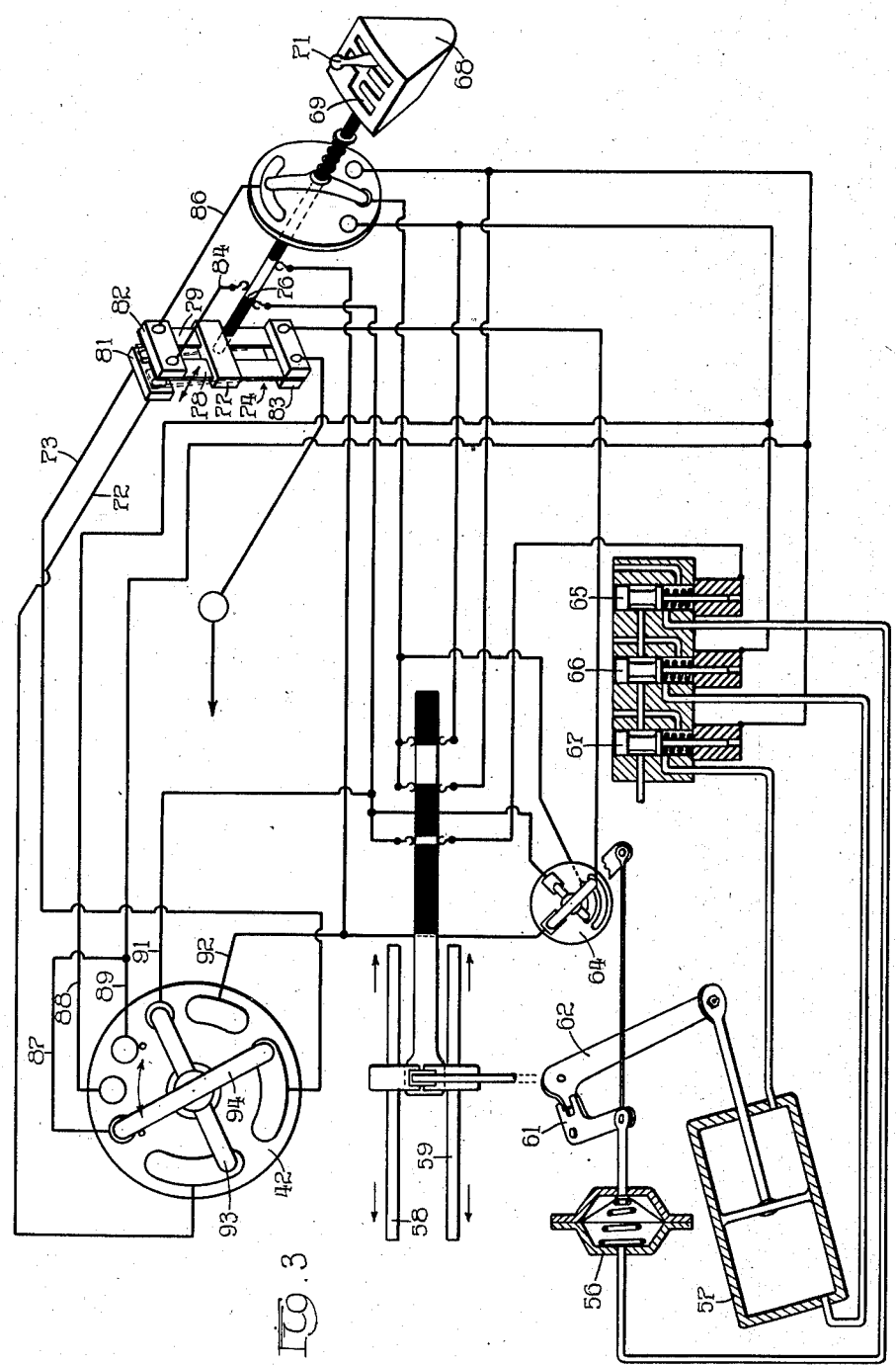

2,220,996

UNITED STATES PATENT OFFICE 2,220,996

AUTOMATIC RATIO SELECTOR FOR ELECTRICALLY CONTROLLED GEAR SHIFTING MECHANISM

George R. Feigel, Chicago, Ill.

Application June 12, 1937, Serial No. 147,938

16 Claims. (Cl. 264—3)

My invention relates to electrically controlled automatic gear shifting mechanism and has particular utility in connection with systems of the type of the so-called "Bendix-Hudson" electrically operated or controlled vacuum transmission gear shifter for use on automobiles, trucks and similar vehicles.

Systems of the type wherein the conventional hand-gear shift lever is replaced by a "finger-tip" control mechanism provided with manual selector means in the form of a small lever or selector switch mounted beneath the steering wheel have been known for some considerable time. In conventional form, the selector switch comprises a small box-like arrangement with a series of slots arranged therein in the general configuration of the letter H, a small lever being adapted to be moved into the five positions which correspond to the three forward speeds or positions, the reverse position, and neutral. In operation, the clutch pedal of the automobile or the like is depressed, the small lever of the manual selecting means is moved with the fingers to the desired gear position, the clutch is engaged by releasing the clutch pedal and the car is in gear. The further shifting of gears is accomplished in the same manner, the movement of the small lever of the manual selecting means closing electrical circuits which serve to effect the operation of the actual gear shifting mechanism.

In accordance with my invention, I employ novel mechanism for effecting automatic shifting of the gears without the necessity for employing manual selector means although it will be appreciated, and as is described hereinafter, that my mechanism may be employed effectively in conjunction with manual selecting means such as described hereinabove.

It is accordingly one object of my invention to provide novel means for effecting automatic shifting of gears in a transmission system having a plurality of forward speeds.

Another object of my invention is the provision of new and improved mechanism for operating a switch automatically in response to different speeds of the drive shaft of an automobile or like vehicle whereby the automatic shifting of gears is controlled.

A further object of my invention is to provide novel means, including a plurality of springs of different strengths which coact with a cam mechanism and a plurality of depressible stop members whereby circuit means are operated to control automatically gear shifting in response to the varying speed of the drive shaft of an automobile.

A still further object of my invention is to provide a simple, inexpensive means, which can be easily installed, and can readily be adapted for use with electrically controlled vacuum gear shifting mechanism to effect the automatic shifting of gears.

Other objects will become apparent in the light of the following more detailed description of the invention.

In general, I employ a so-called automatic ratio selector which, as indicated above, may be, and preferably is, utilized in conjunction with a manual selector means such as has been described above generally. As will be seen from the drawings which will be described in detail later herein, the conventional H form of the manual selector means is modified to provide an extra offset position. When the manual selector lever is moved to this latter position, it functions to operate a double two-way switch which breaks the manually controlled circuit. The novel mechanism of my invention comes into play when the manual selector lever is in the offset position. As in connection with the manually controlled selector means, the automatic shifting of the gears does not take place until the clutch is disengaged by depressing the clutch pedal, this, as in the case of the manually controlled selector mechanism, serving to close switch means in the lead from the battery.

In general, my novel mechanism comprises means which operates in response to the ground speed of the vehicle or the speed of the drive shaft thereof, said means serving to control the movement of a rotary multi-armed switch which closes the proper circuits to effect the automatic shifting of the gears. Automatic control of the shifting of the gears is thus exerted over all forward positions which, in the case of the conventional transmissions for passenger automobiles, comprises three positions, namely, low, second and high gear. The means for controlling the movement of the rotary multi-armed switch comprises a shaft which is operatively connected to the drive shaft or front wheels of the automobile or the like through suitable gearing or other means so as to rotate at a speed responsive to the ground speed of the vehicle. Mounted upon the shaft and rotatable therewith is, preferably, centrifugally operated means which serves to operate a piston and associated cam, the movement of the switch arms of the rotary multi-armed switch being effected by the movement of the cam. A plurality of compression springs of different strengths and a plurality of depressible stop members cooperate with the piston and cam members to effect proper movement of the switch arms in response to the ground speed of the vehicle or of the drive shaft thereof in a novel and effective manner which will now be described in conjunction with the accompanying drawings wherein Fig. 1 is a sectional view of the mechanism which comprises my automatic ratio selector, parts thereof being shown in elevation.

Fig. 2 is a cut-away view showing the arrangement of the piston, cam and associated springs.

Fig. 3 is a diagrammatic view showing the general wiring arrangement for the circuits operating the conventional electrically controlled vacuum gear shifting mechanism but includes the association therewith of the automatic selector switch which is operated in accordance with my invention to control the automatic shifting of the gears.

As illustrated in Fig. 1, the mechanism for operating the rotary multi-armed switch which closes the proper contacts for effecting the automatic shifting of the gears comprises a drive shaft 10 which is operatively connected to the power transmitting mechanism of the vehicle (not shown) so as to rotate at a speed responsive to the speed of the vehicle. A satisfactory connection may also be made to the front wheel through suitable gearing, as for example, such as is employed in driving speedometers. The drive shaft 10 is mounted in a bearing 11, preferably integral with one part 12 of a bi-part housing 13, the two parts of the housing being suitably clamped together as, for example, by means of bolt and nut assemblies 14. Keyed or otherwise locked to the shaft 10 is a centrifugal governor 16 which comprises a head 17 to which the shaft 10 is fixedly connected so as to be rotatable therewith. Pivoted to head 17 at 18 and 19 is a pair of weight arms 21 and 22 each of which is provided with a preferably integral pusher arm 23 and 24. As shown in Fig. 1, the arms of the centrifugal governor have the general arrangement of bellcrank levers.

The forward end of the housing 13 is shaped to provide cylindrical sections 26 and 27, the section 26 having a greater diameter than the section 27 and being separated therefrom by a shoulder 28. Mounted for sliding movement in the section 26 is a piston 29 and arranged for sliding movement in the section 27 is a cam 31. As will be seen from Figs. 1 and 2, the piston 29 is generally hollow and the cam 31 is connected to the inner end of said piston 29 so as to be movable together. If desired, the piston 29 and cam 31 may be made integral or of a plurality of parts suitably interconnected or arranged so as to be movable together in their respective sections.

Encircling the inner end of the cam 31 is a plurality of compression springs, in this case two in number since the embodiment disclosed relates to a transmission system having three forward speeds, the primary spring 32 being lighter or weaker than the secondary spring 33 for a purpose soon to be described. One end of the spring 32 rests against the inner end of the piston 29 and the other end of said spring rests against the shoulder 28. It will be seen, therefore, that the piston 29 is normally urged to the right in the illustration of Fig. 1. The secondary spring 33 is mounted or contained in a separate holder which comprises a sleeve 34 encircling and slidable along the cam 31 and provided with a shoulder 36 against which one end of the secondary spring 33 abuts, the other end of said spring resting against the inner end of the piston 29 in the same way that one end of the spring 32 rests thereagainst. As is shown clearly in Fig. 2, the sleeve 34 is provided with a slot for a portion of its length within which is a stop member 37 fixed to the cam 31 so as to limit the movement of the sleeve on the cam. The spring 33 normally urges the sleeve to the left as shown in Figs. 1 and 2. The cam 31 is provided at its forward end with a pin 38 which moves in a slot 39 formed in a wall of the section 27 and the pin 38 is operatively connected to a lever 41 which, in turn, operates the rotary switch 42. It will thus be seen that the movement of the cam 31 in the section 27 controls the operation of the rotary switch 42 which controls automatically the shifting of the gears through the closing of proper electrical circuits. The forward end of the cam 31 is preferably beveled, as shown in Figs. 1 and 2, and the cam is provided with a groove 40 for a purpose to be described.

Attached to the housing 13 adjacent the section 27 and preferably integral with said housing is a portion 43 provided with apertures 44 and 46 which open into the section 27. The embodiment illustrated, as stated above, being for the operation of a transmission having three forward speeds, two such apertures are provided. Within each of these apertures are disposed resiliently mounted depressible stop members 47 and 48. The stop member 47 is normally urged into the section 27 by means of a spring 49 and the assembly of the spring and stop member is held in place by screw or member 51 screw threaded into the portion 43 of the housing 13. The stop member 48 is mounted in the same manner as in the case of the stop member 47. A third, but rigid, stop member 52 is mounted to project into the section 52. It will be noted that the stop members 47 and 48 normally slightly project into the section 27 and that the projecting portion has a beveled surface in order to facilitate depressing the same when the cam moves thereagainst.

Mounted adjacent the centrifugal governor 16 and in contact with the extremities of the pusher arms 23 and 24 is a thrust plate 53 and mounted therebetween and the piston 29 is a ball thrust bearing 54.

Figure 3 illustrates diagrammatically the electrical circuits and cooperating mechanism for effecting the shifting of gears.

As is well known, the electrically controlled vacuum transmission gear shifting mechanism referred to above comprises a diaphragm cylinder 56 and shift cylinder 57 which serve to control the movement of the shifting rails 58 and 59 of the conventional selective-type three-speed transmission through the medium of levers 61 and 62. The interlock switch 64 and the solenoid operated valves 65, 66 and 67 are similar to those in the system referred to hereinabove. The selector or manual control 68 is generally conventional in form but is modified to include an extra slot or position 69 which, when the lever 71 is shifted thereinto, closes the automatically controlled circuit through the conductors 72 and 73 and breaks the manually controlled circuit through the operation of a double two-way switch 74. As shown in Figure 3, the movement of the lever 71 to the extreme left so as to engage in slot 69 forces the rod 76 against the bar 77 which, in turn, forces the flexible conductor arms or plates 78 and 79 towards the left and in contact with the bar 81 thereby closing the automatic circuit and breaking the manual circuit, it being understood that the bars 82 and 83 are held rigidly. The removal of the lever 71 from the slot 69 breaks the automatically controlled circuit and closes the manually controlled circuit through the conductors 84 and 86. It will thus be seen that, in the arrangement illustrated in Figure 3, a change from manual to automatic control or vice versa is achieved extremely simply.

Through the medium of conductors 87, 88, 89, 91 and 92, and previously mentioned conductors 72 and 73, all connected to conductor posts or terminals on the switch 42, as shown in Figure 3, the electrical circuits which control the shifting of gears are automatically operated when the lever 71 is in slot 69. In view of the fact that the electrical circuits which are opened and closed by the operation of the switch 42 are essentially similar to those operated by the manual control, a description thereof does not appear to be necessary.

It is believed that the operation of the novel structure of my invention is clear in the light of the foregoing description. However, I shall describe the manner in which the same operates to control automatically and in a simple and effective way the automatic shifting of gears in a system of the type heretofore described.

Assuming that the automobile or other vehicle is at rest, the selector lever 71 is placed in the slot 69. In this state, the arms 93 and 94 of the rotary switch 42 are in a position for the shift into low speed. This shift takes place as soon as the clutch operated switch is closed, namely, by depressing the clutch pedal. On release of the clutch pedal, or in other words when the clutch engages, the accelerator is gradually depressed and the automobile will move forward in first speed. As the speed of the vehicle increases, the shaft 10, the speed of rotation of which is responsive to the ground speed of the vehicle, rotates more rapidly. The weight arms 21 and 22 of the centrifugal governor 16 move away from their rest position and the pusher arms 23 and 24 exert pressure to force the cam 31 to the left, as shown in Figure 1, overcoming the resistance of the friction and the primary spring 32. The travel of the sliding cam 31 is now halted by the depressible stop 48 after the cam 31 has been forced against it. The movement of the cam 31 between its normal position, which is the extreme right as shown in Figure 1, and its position in abutment against the stop 48, due to the low resistance offered by the relatively weak spring 32, is very rapid as distinguished from a slow, progressive movement such as results from an uncontrolled governor. This is a very important aspect of my invention since it is imperative for completely proper functioning that at no time shall all of the circuits controlled through the rotary switch 42 be in an open position. Otherwise, the shifting of gears could not be effectively controlled. By means of the employment of depressible stops in the governor control and through the coaction therewith of the springs 32 and 33, the movement of the arms 93 and 94 of the rotary switch is rapid, thus leaving the circuits open for only a brief instant.

When the cam 31 has jumped from its normal position into contact with the depressible stop member 48 and has been halted thereby, the arms 93 and 94 of the rotary switch are in a position to permit the electrically controlled vacuum gear shifter to shift the gears of the vehicle into second forward speed, the movement of the switch arms of the rotary switch 42 being effected by the movement of the lever 41 which swings to the left by virtue of its connection with the pin 38 attached to the cam 31. The clutch pedal is again depressed and the shift into second speed takes place.

As the speed of the vehicle increases, for example, to fifteen miles per hour, the centrifugal force becomes sufficiently great for the cam 31 to depress the stop 48 and jump rapidly into contact with the stop 52. In so moving, the weight and pusher arms 21, 22, 23 and 24, the thrust plate 53, and the sliding cam 31 assume the positions shown in dotted lines in Figure 1, overcoming the resistance of the primary and secondary springs 32 and 33 and the friction of the depressible stops against the cam. When the head of the cam 31 abuts the stop 52, the arms 93 and 94 of the rotary switch 42 are in position for the shift into third forward speed, such being accomplished, upon depressing the clutch pedal, through the operation of the solenoid 67. It will be noted that when the head of the sliding cam 31 abuts against the stationary stop 52, the depressible stop 47 rises and enters the groove 40 of the cam 31, thereby maintaining the cam 31 in its position corresponding to third forward speed.

When the vehicle decelerates to a speed of, for example, ten miles per hour or less, the released energy of the compression primary and secondary springs 32 and 33 is great enough to depress the stop 47 whereby the sliding cam 31 snaps or moves rapidly to the right, as shown in Figure 1, to a position corresponding to second forward speed. When the vehicle is brought to a stop or slows down to a sufficient extent, which is determined by the strength of the primary spring 32, the cam 31 returns to its low speed position by virtue of the release of the energy of the primary spring 32.

The purpose behind the employment of primary and secondary springs of different compression strengths to resist the force exerted by the centrifugal governor is believed to be clear. The primary spring 32 is relatively light or weak and its chief function is to return the sliding cam 31 to a position corresponding to first forward speed. The secondary spring 33 functions only between second and third forward speeds and serves to return the sliding cam 31 from third forward speed to second forward speed.

The purpose behind the use of the depressible stops 47 and 48 is likewise thought evident in the light of the foregoing description. As stated, these stops, coacting with the springs 32 and 33, prevent the sliding cam 31 from lingering between the stops. The depressible stop 48 holds the sliding cam 31 until sufficient force has been built up to compress the primary and secondary springs 32 and 33 to the required extent. The depressible stop 47 holds the sliding cam 31 from returning to normal position until the force exerted by the centrifugal governer becomes sufficiently low so that the secondary and primary springs 33 and 32, respectively, can move the required distance at a single stroke.

It will be understood that there is a direct relationship between the strengths of the springs 32 and 33 and those which urge the stop members 47 and 48 upwardly, namely, the spring 49 and the corresponding spring which coacts with stop member 48. The strengths of the springs selected will govern the rapidity with which the cam 31 jumps between the stop members and the strengths of these springs will also control the speed at which the shift from first to second and from second to third forward speeds takes place. Those skilled in the art will be able to select springs of the proper strength and relationship to each other in order to effect the proper functions desired.

While the novel mechanism of my invention has been illustrated in conjunction with a transmission system having three forward speeds, it will be appreciated that the principles of my invention can be adapted to transmission systems having a plurality of forward speeds in excess of three. In such cases, it will be understood that the number of springs of different compressive strengths which surround the cam member will increase in proportion to the increase in the number of forward speeds of the transmission system.

While I have described my invention in considerable detail, it will be understood that the disclosure is to be taken in a descriptive and not in a limitative sense, the scope of the invention being set out in the claims.

What I claim as new and desire to protect by Letters Patent of the United States is:

1. Apparatus of the character described comprising power means, centrifugal governor means driven by said power means, a piston provided with a sliding cam, said piston and sliding cam being moved responsive to the actuation of the centrifugal governor, said piston having a larger diameter than said sliding cam, slideways within which said piston and said sliding cam are adapted to move longitudinally, a plurality of springs of different compressive strengths surrounding said sliding cam, a plurality of spaced spring pressed stop members mounted to engage said sliding cam and be depressed thereby, and a pin attached to said sliding cam.

2. Apparatus of the character described comprising power means, a housing including cylindrical sections of different diameters separated by a shoulder and within which sections a generally hollow piston and an interconnected cam member are mounted for reciprocatory motion, the piston having a larger diameter than the cam member, a first compression spring encircling said cam member and disposed between said shoulder and the inner end of said piston, a second compression spring encircling said cam member and disposed between an abutment on said cam member and the inner end of said piston, said second compression spring having greater strength than said first compression spring, two spaced spring pressed stop members each of which is adapted to be depressed by said cam member, said cam member being provided with a groove in its surface which is engaged by one of said stop members when the cam member is in its furthermost advanced position, and means responsive to the speed of the power means for controlling the forward movement of the piston and cam member, the compression springs normally urging the reverse movement of said piston and cam member.

3. Apparatus of the character described comprising a piston provided with a cam, said piston and cam being adapted for reciprocatory movement longitudinally of their axes, a plurality of springs of different compressive strengths encircling said cam, a plurality of spaced spring pressed stop members mounted to engage said cam during stages of its longitudinal movement, and means responsive to the speed of said power means for controlling the forward movement of said piston and cam, the reverse movement thereof being controlled by said encircling springs.

4. An automatic ratio selector for electrically controlled gear shifting mechanism comprising a cam member and means within which said cam member reciprocates longitudinally of its axis, two springs of different compressive strengths encircling said cam member, two spring pressed stop members mounted to engage said cam member during stages of its longitudinal movement, and means for advancing said cam member in a forward direction against the action of said encircling springs.

5. An automatic ratio selector for electrically controlled gear shifting mechanism comprising a slideway, a cam member mounted for reciprocatory movement longitudinally of its axis in said slideway, a piston operatively connected to said cam member and movable therewith, two springs of different compressive strengths encircling said cam member, two resiliently mounted stop members so arranged as normally to project into said slideway to engage said cam member at stages of its movement therein, and means for advancing the cam member in said slideway against the action of said encircling springs.

6. Apparatus of the character described comprising power means, centrifugal governor means driven by said power means, a piston provided with a sliding cam, slideways within which said piston and said sliding cam are adapted to move longitudinally, a plurality of springs of different compressive strengths surrounding said sliding cam, and a plurality of spaced spring pressed stop members mounted to engage said sliding cam and be depressed thereby, the forward movement of said piston and sliding cam being effected by said governor means and the reverse movement thereof being controlled by said surrounding springs, the spring pressed stop members and the surrounding springs being so constructed and arranged that the sliding cam jumps rapidly between the stop members in response to predetermined speeds of said power means.

7. Apparatus of the character described comprising power means, a housing, a slidably mounted cam disposed in said housing, two compression springs of different strengths encircling part of said cam, means for moving said cam in a forward direction longitudinally of its axis and against the action of said springs, two spaced spring pressed stop members adapted to be engaged and depressed by said cam, a third stop member, and a groove in said cam adapted to be engaged by one of said spring pressed stop members when the cam is in its furthermost advanced position, the spring pressed stop members and said compression springs being so constructed and arranged that the cam jumps rapidly between the stop members in response to predetermined speeds of said power means.

8. Apparatus of the character described comprising power means, a housing, a slidably mounted cam disposed in said housing, two compression springs of different strengths encircling part of said cam, centrifugal governor means for moving said cam in a forward direction longitudinally of its axis and against the action of said springs, two spaced spring pressed stop members adapted to be engaged and depressed by said cam, and a third stop member, the spring pressed stop members and said compression springs being so constructed and arranged that the cam jumps rapidly between the stop members in response to predetermined speeds of said power means.

9. Apparatus of the character described comprising a housing including cylindrical sections of different diameters separated by a shoulder and within which sections a generally hollow piston and an interconnected cam member are mounted for reciprocatory motion, the piston having a larger diameter than the cam member, a first compression spring encircling said cam member and disposed between said shoulder and the inner end of said piston, a second compression spring encircling said cam member and disposed between an abutment on said cam member and the inner end of said piston, said second compression spring having greater strength than said first compression spring, two spaced spring pressed stop members each of which is adapted to be depressed by said cam member and one of which is in constant contact with said cam member, said cam member being provided with a groove in its surface which is engaged by said last-mentioned spring pressed stop member when the cam member is in its furthermost advanced position, and means responsive to the speed of the power means for controlling the forward movement of the piston and cam member, the compression springs normally urging the reverse movement of said piston and cam member.

10. Apparatus of the character described comprising a propeller shaft, means providing cylindrical sections of different diameters separated by a shoulder and within which sections a generally hollow piston and an interconnected cam member are mounted for reciprocatory motion, the piston having a larger diameter than the cam member, a first compression spring encircling said cam member and disposed between said shoulder and the inner end of said piston, a sleeve encircling said cam member and having limiting sliding movement therealong, said sleeve being provided with a shoulder, a second compression spring encircling said sleeve and disposed between the shoulder on said sleeve and the inner end of said piston, said second compression spring having greater strength than said first compression spring, two spaced spring pressed stop members each of which is adapted to be depressed by said cam member, said cam member being provided with a groove in its surface which is engaged by one of said stop members when the cam member is in its furthermost advanced position, and means responsive to the speed of the propeller shaft for controlling the forward movement of the piston and cam member, the compression springs normally urging the reverse movement of said piston and cam member, the spring pressed stop members and said compression springs being so constructed and arranged that the cam jumps rapidly between the stop members in response to predetermined speeds of said propeller shaft.

11. Apparatus of the character described comprising a piston provided with a cam, said piston and cam being adapted for reciprocatory movement longitudinally of their axes, two springs of different compressive strengths encircling said cam, two spaced spring pressed stop members mounted to engage said cam during stages of its longitudinal movement, and means responsive to the speed of said power means for controlling the forward movement of said piston and cam, the reverse movement thereof being controlled by said encircling springs, the spring pressed stop members and said compression springs being so constructed and arranged that the cam jumps rapidly between the stop members in response to predetermined speeds of said power means.

12. An automatic ratio selector for electrically controlled gear shifting mechanism comprising a cam member and means within which said cam member reciprocates longitudinally of its axis, a first spring encircling said cam member, a sleeve surrounding a part of said cam member and having limited slidable movement thereon, an abutment on said sleeve, a second spring encircling said sleeve and one end of which spring rests against said abutment, said second spring being stronger than said first spring, two spring pressed stop members mounted to engage said cam member during stages of its longitudinal movement, and means for advancing said cam member in a forward direction against the action of said encircling springs.

13. An automatic ratio selector for electrically controlled gear shifting mechanism comprising a slideway, a cam member mounted for reciprocatory movement longitudinally of its axis in said slideway, a piston operatively connected to said cam member and movable therewith, two springs of different compressive strengths encircling said cam member, a first resiliently mounted stop member so arranged as normally to project into said slideway to engage said cam member at stages of its movement therein, a second resiliently mounted stop member in constant contact with said cam member, a groove in said cam member in which said second stop member is adapted to engage when said cam member is in its furthermost advanced position, and means for advancing the cam member in said slideway against the action of said encircling springs.

14. Apparatus of the character described comprising a piston provided with a cam, said piston and cam being mounted for reciprocatory movement longitudinally of their axes, two spaced spring pressed stop members mounted to engage and be depressed by said cam during stages of its longitudinal movement, and two springs of different compressive strengths cooperating with said cam and said stop members to effect rapid movement of said cam between the stop members.

15. Apparatus of the character described comprising a slidably mounted cam, at least two resilient members having different degrees of resiliency, means for moving said cam in a forward direction longitudinally of its axis and against the action of said resilient members, and a plurality of resiliently mounted stop members adapted to be engaged and depressed by said cam.

16. An automatic ratio selector for automatic gear shifting mechanism comprising a cam member and means within which said cam member reciprocates longitudinally of its axis, two resilient members of different degrees of resiliency associated with said cam member, two spring pressed stop members mounted to engage said cam member during stages of its longitudinal movement, and means for advancing said cam member in a forward direction against the action of said resilient members.

GEORGE R. FEIGEL.